United States Patent
Kim

(10) Patent No.: US 10,173,513 B2
(45) Date of Patent: Jan. 8, 2019

(54) DOG-BONE TYPE REAR ROLL ROD

(71) Applicant: Hyundai Motor Company, Seoul (KR)

(72) Inventor: Seung Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 77 days.

(21) Appl. No.: 15/375,406

(22) Filed: Dec. 12, 2016

(65) Prior Publication Data

US 2018/0105028 A1     Apr. 19, 2018

(30) Foreign Application Priority Data

Oct. 19, 2016 (KR) .................. 10-2016-0135466

(51) Int. Cl.
*B60K 5/12* (2006.01)

(52) U.S. Cl.
CPC ...... *B60K 5/1216* (2013.01); *B60K 2350/106* (2013.01); *B60K 2350/924* (2013.01); *B60Y 2304/03* (2013.01); *B60Y 2304/05* (2013.01); *B60Y 2400/48* (2013.01)

(58) Field of Classification Search
CPC .............. B60K 5/1216; B60Y 2304/05; B60Y 2400/48; B60Y 2304/03
See application file for complete search history.

(56) References Cited

U.S. PATENT DOCUMENTS

| 3,552,785 | A | * | 1/1971 | Elder et al. | B60G 3/20 267/67 |
| 4,575,114 | A | * | 3/1986 | Camp | F16F 1/3732 267/141 |
| 4,641,855 | A | * | 2/1987 | Izumi | B60G 7/02 267/258 |
| 8,002,252 | B2 | * | 8/2011 | Howorth | F16F 1/54 248/632 |
| 8,439,377 | B2 | * | 5/2013 | Kim | B62D 21/11 280/124.109 |
| 8,839,900 | B2 | * | 9/2014 | Kim | F16F 13/1463 180/312 |
| 2006/0244188 | A1 | * | 11/2006 | Johnson | F16F 1/3735 267/293 |
| 2015/0204405 | A1 | * | 7/2015 | Shimada | F16F 1/3828 267/141.2 |
| 2015/0204406 | A1 | * | 7/2015 | Yoon | F16F 6/005 248/562 |
| 2016/0221430 | A1 | * | 8/2016 | Kim | F16F 1/371 |

FOREIGN PATENT DOCUMENTS

| KR | 1020070060401 A | 6/2007 |
| KR | 20090052051 A | 5/2009 |
| KR | 101041628 B1 | 6/2011 |
| KR | 101262007 B1 | 5/2013 |

* cited by examiner

*Primary Examiner* — Darlene P Condra
(74) *Attorney, Agent, or Firm* — Slater Matsil, LLP

(57) ABSTRACT

Disclosed is a dog-bone type rear roll rod in which a body bracket, which is fixed to a vehicle body, and front and rear rubbers, which are disposed at front and rear sides of the body bracket, respectively, are connected together through an inner pipe and fastened to a rod by means of a fastening member, the dog-bone type rear roll rod including: an extrusion plate which has a through hole formed such that the inner pipe penetrates a center of the extrusion plate, has a width length greater than a width length of the rod, and is press-fitted between the rod and the front rubber.

8 Claims, 4 Drawing Sheets

DOG-BONE TYPE REAR ROLL ROD

CROSS-REFERENCE TO RELATED APPLICATIONS

This application claims under 35 U.S.C. § 119(a) the benefit of Korean Patent Application No. 10-2016-0135466 filed on Oct. 19, 2016, the entire contents of which are incorporated herein by reference.

TECHNICAL FIELD

The present disclosure relates to a dog-bone type rear roll rod.

BACKGROUND

In general, as a method of supporting a powertrain for a vehicle, there are an inertial support method, a center support method, and a composite support method. At present, among these methods, the inertial support method, which is relatively excellent in respect to idle performance, is widely used, and the inertial support method uses a principal axis of inertia of an engine, and is classified into a four-point support method and a three-point support method based on the number of mounts.

Here, the four-point support method is a method in which an engine mount and a transmission mount are positioned at an upper end or a lateral side of a side member of a vehicle body, and front and rear roll stoppers are mounted on a sub frame.

In contrast, the three-point support method is a method in which an engine mount disposed at one side of an engine and a transmission mount disposed at one side of a transmission are mounted at an upper end or a lateral side of a side member of a vehicle body like the four-point support method, but a roll rod, instead of the front and rear roll stoppers, is mounted on a sub frame or a cross member.

Recently, in most instances, the inertial three-point support method is also applied and adopted by a high-torque engine for a medium-sized/large-sized vehicle, and an I-shaped sub frame type is widely adopted in order to reduce a weight of the vehicle. Accordingly, an importance of the three-point support method is emphasized, and it is necessary to develop the roll rod to be used. Further, the roll rod, which is used for the three-point support method, is used such that one side of the roll rod is fixed to the powertrain and the other side of the roll rod is fixed to the sub frame.

Meanwhile, the powertrain refers to a series of all devices, such as a clutch, a transmission, a final reduction gear device, and the like that transmit power generated by the engine to drive wheels, and a front bushing of the roll rod is fixed to the powertrain and serves to primarily reduce vibration.

Typically, a rear bushing of the roll rod more sensitively reacts to insulate impact and vibration in comparison with the front bushing connected to the powertrain. Therefore, a number of efforts have been made to improve performance of the roll rod by developing the rear bushing in the art.

That is, because a rod portion of a structure of the roll rod has a predetermined length and is positioned at a lowest end of the vehicle, there is great concern that the rod portion will be damaged due to external factors, and as a result, the roll rod is generally made of aluminum or steel. In addition, at the time of a sudden unintended acceleration evaluation, the engine mount and the transmission mount support force at an upper end, but at a lower end, the rear roll rod supports the resultant force of the two mounts, and as a result, a significantly high load is applied to the rod portion.

Therefore, the rod portion is an important portion in respect to reducing weights and costs and ensuring strength and rigidity when the rod portion of the roll rod is manufactured, and as a result, a squeeze process method, which has long cycle timing and makes it easy to ensure strength and rigidity, is generally used. However, the squeeze process method is very disadvantageous in terms of costs, and as a result, there is a need for a structure which is excellent in respect to improving cost efficiency as well as strength and rigidity.

The following patent literature is related to subject matter disclosed herein: Korean Patent Application Laid-Open No. 10-2007-0060401 (Jun. 13, 2007).

The above information disclosed in this Background section is only for enhancement of understanding of the background of the invention and therefore it may contain information that does not form the prior art that is already known in this country to a person of ordinary skill in the art.

SUMMARY

The present disclosure relates to a dog-bone type rear roll rod. Particular embodiments relate to a dog-bone type rear roll rod that enables a reduction in costs by reducing manufacturing time and the number of molds. As such, embodiments of the invention can solve the above-described problems associated with the prior art, and to provide a dog-bone type rear roll rod, in which a rod is manufactured by an extrusion method such that it is possible to reduce costs and weights, and an extrusion plate is fitted with the rod in a sliding manner in order to increase a cross-sectional area of an end portion of the rod, which is positioned to face a front rubber, such that it is possible to uniformly disperse a load transmitted through the rod to the front rubber.

In one aspect, the present invention provides a dog-bone type rear roll rod in which a body bracket, which is fixed to a vehicle body, and front and rear rubbers, which are disposed at front and rear sides of the body bracket, respectively, are connected together through an inner pipe and fastened to a rod by means of a fastening member. The dog-bone type rear roll rod includes an extrusion plate which has a through hole formed such that the inner pipe penetrates a center of the extrusion plate, has a width length greater than a width length of the rod, and is press-fitted between the rod and the front rubber.

In a preferred embodiment, a position of the extrusion plate may be fixed as the extrusion plate slides in a state in which both end portions at one side of the extrusion plate, which face the rod, are formed to be bent in a '⊏' shape and fitted with the rod, and a pair of fitting holes may be formed along an outer circumferential surface of the rod so that both of the bent end portions of the extrusion plate are inserted into the pair of fitting holes and slide.

In another preferred embodiment, a pair of extrusion plates having the same shape may be provided between the rod and the front rubber and at a position facing the rear rubber.

In still another preferred embodiment, the extrusion plate may include: a first plate which is disposed between the rod and the front rubber; and a second plate which is disposed to face the rear rubber and has a thickness different from a thickness of the first plate.

In yet another preferred embodiment, the extrusion plate may be manufactured by an aluminum extrusion process method.

In another aspect, the present invention provides a vehicle that includes a vehicle body, a body bracket fixed to the vehicle body, a front rubber disposed at a front side of the body bracket, a rear rubber disposed at a rear side of the body bracket, an inner pipe connecting together the body bracket and the front and rear rubbers, a rod, the body bracket and the front and rear rubbers being fastened to the rod by a fastening member, and a dog-bone type rear roll rod comprising an extrusion plate which has a through hole formed such that the inner pipe penetrates a center of the extrusion plate, has a width length greater than a width length of the rod, and is press-fitted between the rod and the front rubber.

According to the present invention, since the rod is manufactured by the extrusion method, it is possible to reduce costs and weights. Further, since the extrusion plate is fitted with the rod in a sliding manner in order to increase a cross-sectional area of the end portion of the rod which is positioned to face the front rubber, it is possible to uniformly disperse the load transmitted through the rod to the front rubber.

According to the present invention, since all of the extrusion plates, which are coupled to face the rod and the front rubber and face the rear rubber, are manufactured by the extrusion method, it is possible to reduce time required to manufacture the roll rod.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
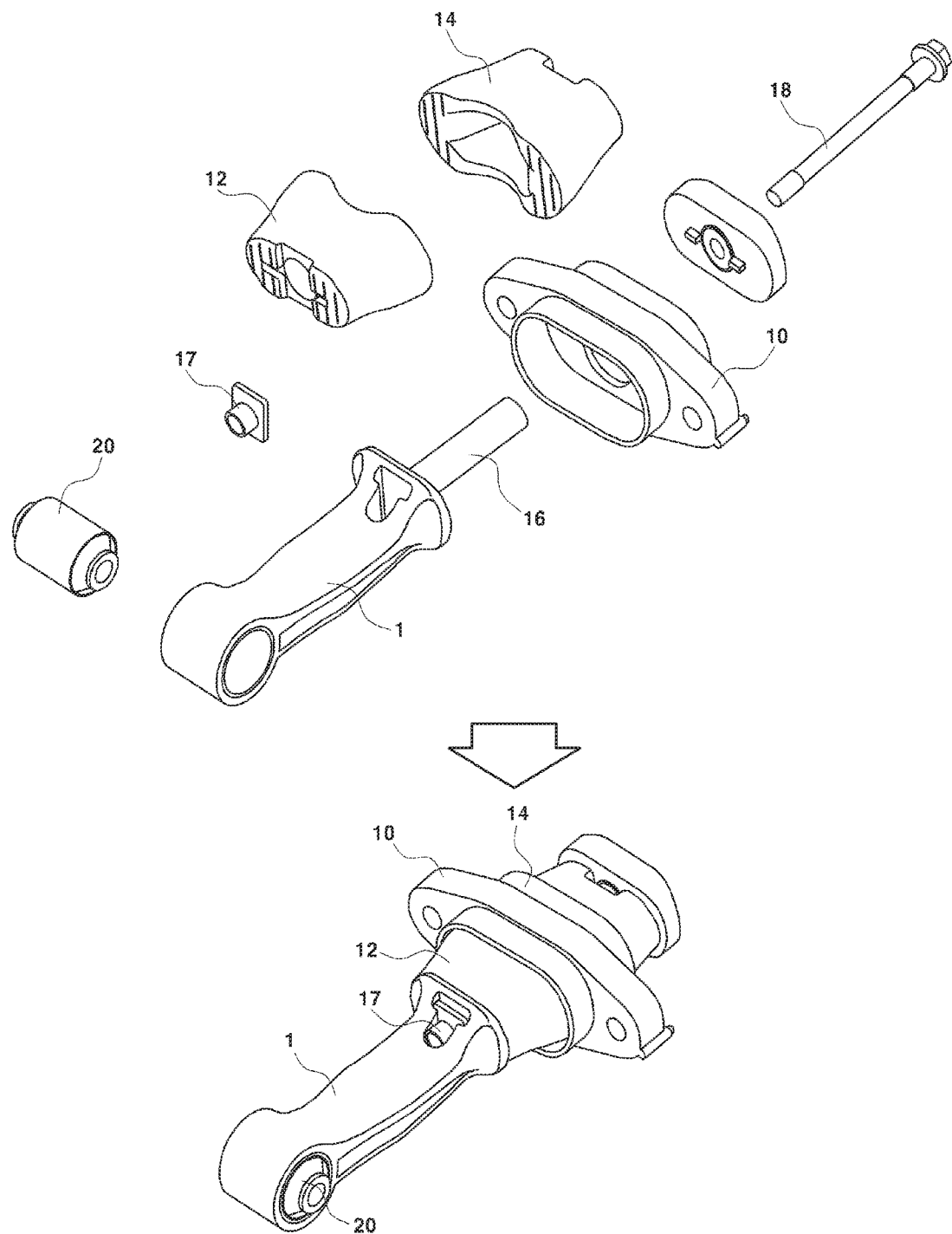
FIG. 1 is an exploded perspective view illustrating a dog-bone type rear roll rod in the related art.

The following reference numerals can be used in conjunction with the drawings:

1: rod
1a: fitting hole
10: body bracket
12: front rubber
14: rear rubber
16: inner pipe
18: fastening member
20: insulator
100: extrusion plate
100a: through hole
110: first plate
120: second plate It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Advantages and features of the present invention and methods of achieving the advantages and features will be clear with reference to the exemplary embodiments described in detail below together with the accompanying drawings.

However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims.

In the description of the present invention, a detailed explanation of publicly known related technologies may be omitted so as to avoid unnecessarily obscuring the subject matter of the present invention.

Figure 2:
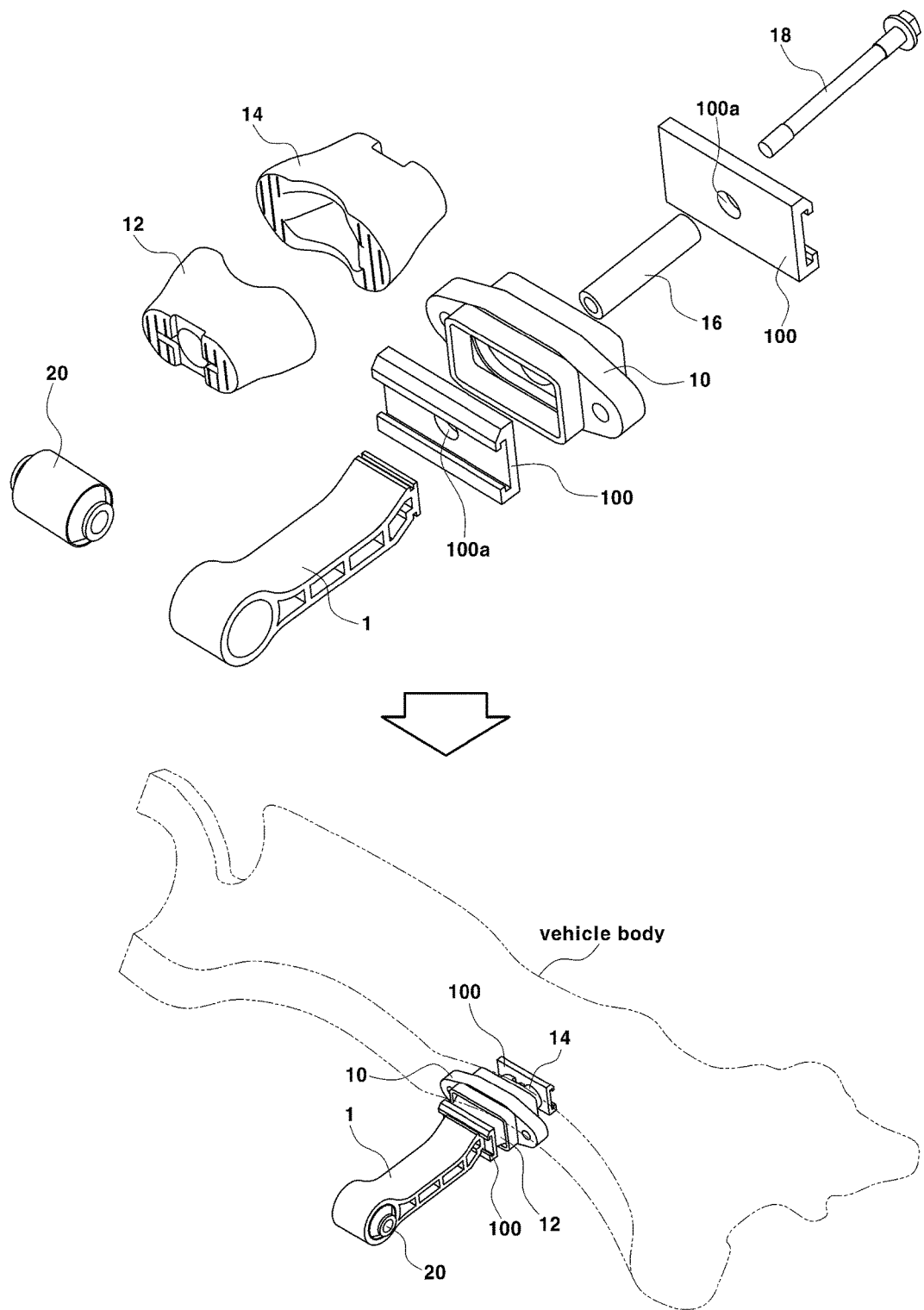
FIG. 2 is an exploded perspective view illustrating a dog-bone type rear roll rod according to an exemplary embodiment of the present invention.

FIG. 1 is an exploded perspective view illustrating a dog-bone type rear roll rod in the related art, and FIG. 2 is an exploded perspective view illustrating a dog-bone type rear roll rod according to an exemplary embodiment of the present invention.

Figure 3:
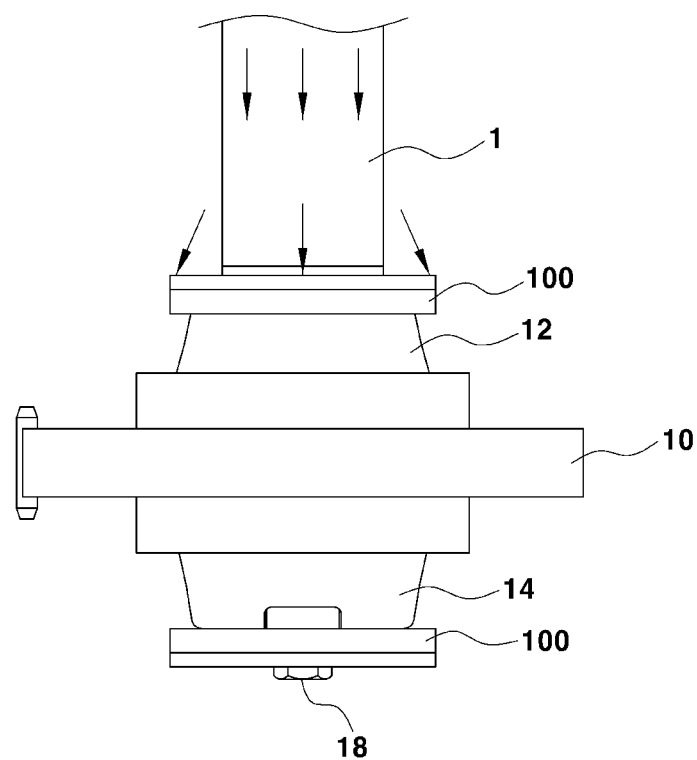
FIG. 3 is a view illustrating a state in which the dog-bone type rear roll rod according to the exemplary embodiment of the present invention is coupled.
Figure 4:
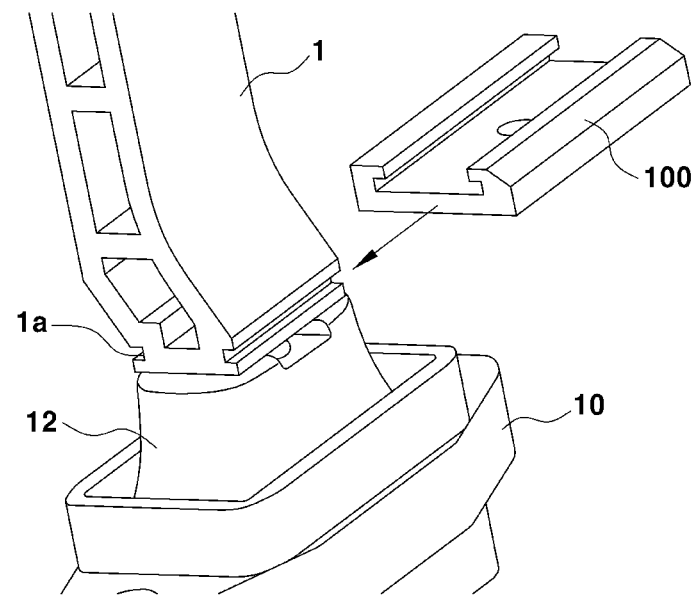
FIG. 4 is a view illustrating a state in which an extrusion plate is coupled to the dog-bone type rear roll rod according to the exemplary embodiment of the present invention.

FIG. 3 is a view illustrating a state in which the dog-bone type rear roll rod according to the exemplary embodiment of the present invention is coupled, and FIG. 4 is a view illustrating a state in which an extrusion plate is coupled to the dog-bone type rear roll rod according to the exemplary embodiment of the present invention.

As illustrated in FIG. 1, the dog-bone type rear roll rod includes a body bracket 10 which is fixed to a vehicle body, and a front rubber 12 and a rear rubber 14 which are disposed at front and rear sides of the body bracket 10, respectively, and serve to attenuate vibration and noise transmitted through a rod 1 and to control displacement of a powertrain when the large displacement of the powertrain occurs.

The dog-bone type rear roll rod is connected to the powertrain of the vehicle and functions as a damper, and the dog-bone type rear roll rod has an insulator 20 which is inserted and installed into a connecting portion provided at an end portion of the rod 1.

The dog-bone type rear roll rod further includes an inner pipe 16, and in a state in which the fastening member 18 is coupled by sequentially penetrating the inner pipe 16, the rear rubber 14, the body bracket 10, and the front rubber 12, the fastening member 18 is fastened to a coupling member 17, such that the fastening member 18 is fixedly fastened to the rod 1 by the coupling member 17.

However, the rod 1 of the dog-bone type rear roll rod in the related art is made of steel or aluminum and needs to be formed to have a predetermined length when the rod 1 is manufactured, and as a result, it is necessary to reduce costs and weights.

That is, the rod 1 generally needs to have a predetermined length so as to be mounted at a point of a sub frame which is close to a center of gravity of the powertrain, and there is a drawback in that the rod 1 is frequently damaged due to external factors because the rod 1 is positioned at a lowest end of the vehicle. In addition, at the time of a sudden unintended acceleration evaluation, an engine mount and a transmission mount support loads at an upper end, but at a lower end, the rear roll rod supports the resultant loads of the two mounts, and as a result, a significantly high load is applied to the rod 1.

Therefore, the rod 1 is an important portion in respect to reducing weights and costs and ensuring strength and rigidity, and as a result, a large amount of time is required to manufacture the rod 1, and a squeeze process method is generally used to ensure strength and rigidity.

However, when manufacturing the rod 1 by using the squeeze process method, two rods 1 generally need to be manufactured by a set of molds because of a large size of the rod 1. Therefore, the squeeze process method is very disadvantageous in terms of costs, and as a result, there is a great loss of materials because of scraps, which causes an increase in costs.

To this end, in the present exemplary embodiment, the rod 1 is manufactured by an aluminum extrusion process method. As illustrated in FIG. 2, the present exemplary embodiment includes extrusion plates 100 in order to prevent the front rubber 12 from being damaged by a load transmitted in a longitudinal direction of the rod 1 when manufacturing the rod 1, and to effectively disperse the applied load and transmit the load to the front rubber 12.

In other words, when manufacturing the rod 1 by using the aluminum extrusion process method, both sides of the rod 1 in the longitudinal direction and an end portion of the rod 1, which faces the front rubber 12, are horizontally cut during the extrusion process in order to minimize costs. In this case, the end portion facing the front rubber 12 is sharpened, such that the front rubber 12 may be damaged by the transmitted load. Further, as illustrated in FIG. 3, a cross-sectional area made by the cutting is smaller than the front rubber 12, and as a result, the load may not be easily transmitted in the arrow direction.

Therefore, in the present exemplary embodiment, a through hole bow is formed such that the inner pipe 16, which is provided separately from the rod 1, penetrates the center of the extrusion plate 100, and as illustrated in FIG. 3, the extrusion plate 100 has a width greater than a width length of the rod 1 and is press-fitted between the rod 1 and the front rubber 12, and as a result, it is possible to solve the aforementioned problem.

That is, as illustrated in FIG. 4, a position of the extrusion plate 100 may be fixed as the extrusion plate 100 slides in a state in which both end portions at one side of the extrusion plate 100, which face the rod 1, are formed to be bent in a '⊏' shape and fitted with the rod 1 at one side.

Here, the extrusion plate 100 may be formed in a '⊏' shape and then coupled to the rod 1 in a rail manner as described above, but the extrusion plate 100 may be formed in other shapes so that the extrusion plate 100 may be primarily fixed in a case in which the extrusion plate 100 is coupled to the rod 1.

To this end, a pair of fitting holes 1a is formed along an outer circumferential surface of the rod 1 so that both of the bent end portions of the extrusion plate 100 are inserted into the pair of fitting holes 1a and slide so that the through hole bow is inserted into a fastening hole (not illustrated) which is formed at a center of the rod 1 and to which the fastening member 18 is fastened.

The extrusion plate 100 may be manufactured by the extrusion process method in order to reduce manufacturing time, costs, and weights.

In addition, according to the dog-bone type rear roll rod according to the present exemplary embodiment, the extrusion plate 100, as well as the rod 1 and the body bracket 10, may also be manufactured by the extrusion process method, and as a result, the dog-bone type rear roll rod is more advantageous than the related art in respect to reducing costs and weights.

Meanwhile, a pair of extrusion plates 100 having the same shape is provided between the rod 1 and the front rubber 12 and at the position facing one end portion of the rear rubber 14, as described above.

Therefore, when manufacturing the extrusion plate 100 by using the extrusion process method, a plurality of extrusion plates 100 having the same shape may be manufactured, and may be applied in common between the rod 1 and the front rubber 12 and at the position facing one end portion of the rear rubber 14, thereby effectively reducing costs.

Figure 5:
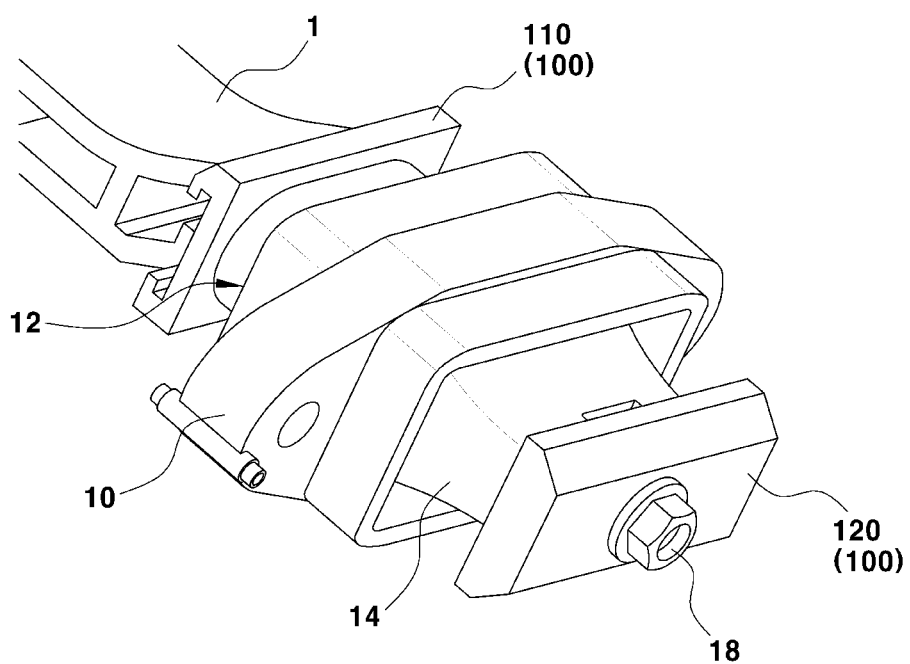
FIG. 5 is a view illustrating extrusion plates coupled to a dog-bone type rear roll rod according to another exemplary embodiment of the present invention.

FIG. 5 is a view illustrating extrusion plates coupled to a dog-bone type rear roll rod according to another exemplary embodiment of the present invention.

As illustrated in FIG. 5, the dog-bone type rear roll rod according to the present exemplary embodiment includes the extrusion plates 100, and the extrusion plate 100 includes a first plate no and a second plate 120.

First, the first plate no is disposed between the rod 1 and the front rubber 12, and both end portions at one side of the first plate no, which face the rod 1, are formed to be bent in a '⊏' shape, and are coupled to the rod 1 by sliding in a state of being inserted into the fitting holes is provided in the rod 1.

The second plate 120 is disposed to face the rear rubber 14, and has a thickness different from a thickness of the first plate 110.

The second plate 120 not only has a thickness different from that of the first plate 110, but also has an area different from that of the first plate 110, and the second plate 120 different from the first plate 110 may be applied in accordance with torque of an engine mounted in a vehicle.

That is, because the load transmitted through the rod 1 is higher in an engine using high torque than in an engine using low torque, it is possible to effectively cope with the case in which the first and second plates 110 and 120 are applied to the engines using different torque, by applying the first and second plates 110 and 120 having different thicknesses and areas.

Here, all of the first and second plates 110 and 120 may be manufactured by the aluminum extrusion process method, and the reason is to optimize costs and weights.

According to the present invention, since the rod is manufactured by the extrusion method, it is possible to reduce costs and weights. Further, since the extrusion plate is fitted with the rod in a sliding manner in order to increase a cross-sectional area of the end portion of the rod which is positioned to face the front rubber, it is possible to uniformly disperse the load transmitted through the rod to the front rubber.

According to the present invention, since all of the extrusion plates, which are coupled to face the rod and the front rubber and face the rear rubber, are manufactured by the extrusion method, it is possible to reduce time required to manufacture the roll rod.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A dog-bone type rear roll rod in which a body bracket, which is fixed to a vehicle body, and front and rear rubbers, which are disposed at front and rear sides of the body bracket, respectively, are connected together through an inner pipe and fastened to a rod by means of a fastening member, the dog-bone type rear roll rod comprising:
    an extrusion plate which has a through hole formed such that the inner pipe penetrates a center of the extrusion plate, has a width length greater than a width length of the rod, and is press-fitted between the rod and the front rubber;
    wherein a position of the extrusion plate is fixed as the extrusion plate slides in a state in which both end portions at one side of the extrusion plate, which face the rod, are formed to be bent in a '⊏' shape and fitted with the rod, and a pair of fitting holes is formed along an outer circumferential surface of the rod so that both of the end portions of the extrusion plate are inserted into the pair of fitting holes and slide.

2. The dog-bone type rear roll rod of claim 1, further comprising a pair of extrusion plates having the same shape provided between the rod and the front rubber and at a position facing the rear rubber.

3. The dog-bone type rear roll rod of claim 1, wherein the extrusion plate includes:
    a first plate which is disposed between the rod and the front rubber; and
    a second plate which is disposed to face the rear rubber and has a thickness different from a thickness of the first plate.

4. The dog-bone type rear roll rod of claim 1, wherein the extrusion plate is comprised of aluminum.

5. A vehicle comprising:
    a vehicle body;
    a body bracket fixed to the vehicle body;
    a front rubber disposed at a front side of the body bracket;
    a rear rubber disposed at a rear side of the body bracket;
    an inner pipe connecting together the body bracket and the front and rear rubbers;
    a rod, the body bracket and the front and rear rubbers being fastened to the rod by a fastening member; and
    a dog-bone type rear roll rod comprising an extrusion plate which has a through hole formed such that the inner pipe penetrates a center of the extrusion plate, has a width length greater than a width length of the rod, and is press-fitted between the rod and the front rubber;
    wherein a position of the extrusion plate is fixed as the extrusion plate slides in a state in which both end portions at one side of the extrusion plate, which face the rod, are formed to be bent in a '⊏' shape and fitted with the rod, and a pair of fitting holes is formed along an outer circumferential surface of the rod so that both of the end portions of the extrusion plate are inserted into the pair of fitting holes and slide.

6. The vehicle of claim 5, further comprising a pair of extrusion plates having the same shape provided between the rod and the front rubber and at a position facing the rear rubber.

7. The vehicle claim 5, wherein the extrusion plate includes:
    a first plate which is disposed between the rod and the front rubber; and
    a second plate which is disposed to face the rear rubber and has a thickness different from a thickness of the first plate.

8. The vehicle of claim 5, wherein the extrusion plate is comprised of aluminum.

* * * * *